US011204758B1

United States Patent
Vattikuti (10) Patent No.: US 11,204,758 B1
(45) Date of Patent: Dec. 21, 2021

(54) COMPUTER CLOUD SYSTEM WITH PREDICTIVE PATCHING

(71) Applicant: Oracle International Corporation, Redwood Shores, CA (US)

(72) Inventor: Srinivas Vattikuti, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/990,043

(22) Filed: Aug. 11, 2020

(51) Int. Cl.
*G06F 8/65* (2018.01)
*G06N 5/02* (2006.01)
*G06N 20/00* (2019.01)
*H04L 29/08* (2006.01)

(52) U.S. Cl.
CPC .................. *G06F 8/65* (2013.01); *G06N 5/02* (2013.01); *G06N 20/00* (2019.01); *H04L 67/10* (2013.01); *H04L 67/34* (2013.01)

(58) Field of Classification Search
CPC .. G06F 8/65; G06N 5/02; G06N 20/00; H04L 67/10; H04L 67/34
See application file for complete search history.

(56) References Cited

U.S. PATENT DOCUMENTS

| | | | | |
|---|---|---|---|---|
| 8,782,664 B2 * | 7/2014 | Dewitt, Jr | ........... | G06F 9/30094 719/310 |
| 9,501,541 B2 | 11/2016 | Doering et al. | | |
| 2006/0048130 A1 * | 3/2006 | Napier | ........... | G06F 8/65 717/168 |
| 2012/0151469 A1 * | 6/2012 | Wookey | ........... | G06F 8/658 717/175 |
| 2014/0075031 A1 * | 3/2014 | Doering | ........... | H04L 47/70 709/226 |
| 2014/0142870 A1 * | 5/2014 | Duan | ........... | G01M 3/2815 702/47 |
| 2014/0245283 A1 * | 8/2014 | Tanaka | ........... | G06F 8/65 717/172 |
| 2018/0011700 A1 * | 1/2018 | Plate | ........... | G06F 8/65 |
| 2018/0188961 A1 * | 7/2018 | Venkatesh | ........... | G06N 20/00 |
| 2018/0349434 A1 * | 12/2018 | Seidel | ........... | G06F 16/2365 |
| 2019/0303127 A1 * | 10/2019 | Krishnaswamy | ........... | G06F 8/60 |
| 2020/0334102 A1 * | 10/2020 | Abdelhalim | ........... | G06F 11/0751 |

FOREIGN PATENT DOCUMENTS

CN 108415789 A * 8/2018 .......... G06F 11/0778

* cited by examiner

*Primary Examiner* — Daxin Wu
(74) *Attorney, Agent, or Firm* — Potomac Law Group, PLLC (57) ABSTRACT

Embodiments determine a patching sequence for applying software patches to correct a plurality of issues on a cloud system that comprises a plurality of pods. Embodiments receive a list of issues that occurred on each of the plurality of pods during a first time duration and, using a Frequent Pattern Growth algorithm, determine issues that frequently occur together and issues that likely follow other issues. Embodiments generate a matrix showing a number of each of the plurality of issues that occurred on each of the pods based on the list of issues during the first time duration, and update the matrix using matrix factorization to provide a relative ranking of each of the issues occurring on each pod. Embodiments then generate the patching sequence comprising a time ordered listing of combinations of pods and issues.

20 Claims, 5 Drawing Sheets

Fig. 2

| Date | Time | Pod | Issue |
|---|---|---|---|
| Apr 19, 2020 | 10:10AM | Pod1 | Issue1 |
| Apr 19, 2020 | 10:10AM | Pod1 | Issue2 |
| Apr 19, 2020 | 10:10AM | Pod1 | Issue3 |
| Apr 19, 2020 | 10:10AM | Pod1 | Issue4 |
| Apr 19, 2020 | 10:10AM | Pod2 | Issue1 |
| Apr 19, 2020 | 10:10AM | Pod5 | Issue1 |
| Apr 19, 2020 | 10:10AM | Pod6 | Issue1 |
| Apr 19, 2020 | 10:10AM | Pod2 | Issue2 |
| Apr 19, 2020 | 10:10AM | Pod3 | Issue2 |
| Apr 19, 2020 | 10:10AM | Pod5 | Issue2 |
| Apr 19, 2020 | 10:10AM | Pod3 | Issue3 |
| Apr 19, 2020 | 10:10AM | Pod6 | Issue3 |
| Apr 19, 2020 | 10:10AM | Pod3 | Issue4 |
| Apr 19, 2020 | 10:10AM | Pod5 | Issue4 |
| Apr 19, 2020 | 10:10AM | Pod4 | Issue5 |
| Apr 19, 2020 | 10:10AM | Pod4 | Issue6 |
| Apr 20, 2020 | 10:10AM | Pod1 | Issue1 |
| Apr 20, 2020 | 10:10AM | Pod1 | Issue2 |
| Apr 20, 2020 | 10:10AM | Pod1 | Issue5 |
| Apr 20, 2020 | 10:30AM | Pod1 | Issue6 |
| Apr 21, 2020 | 10:10AM | Pod1 | Issue2 |
| Apr 21, 2020 | 10:10AM | Pod1 | Issue3 |
| Apr 21, 2020 | 10:10AM | Pod1 | Issue4 |
| Apr 22, 2020 | 10:10AM | Pod1 | Issue5 |
| Apr 22, 2020 | 10:10AM | Pod1 | Issue6 |
| Apr 23, 2020 | 10:10AM | Pod1 | Issue1 |
| Apr 23, 2020 | 10:10AM | Pod1 | Issue2 |
| Apr 23, 2020 | 10:10AM | Pod1 | Issue4 |
| Apr 24, 2020 | 10:10AM | Pod1 | Issue1 |
| Apr 24, 2020 | 10:10AM | Pod1 | Issue3 |
| Apr 19, 2020 | 10:10AM | Pod2 | Issue3 |
| Apr 20, 2020 | 10:10AM | Pod2 | Issue1 |
| Apr 20, 2020 | 10:10AM | Pod2 | Issue2 |

COMPUTER CLOUD SYSTEM WITH PREDICTIVE PATCHING

FIELD

One embodiment is directed generally to a cloud based computer system, and in particular to the patching and upgrading for a cloud based computer system.

BACKGROUND INFORMATION

"Cloud computing" is generally used to describe a computing model which enables on-demand access/availability to a shared pool of computing resources, such as computer networks, servers, software applications, storage and services, and which allows for rapid provisioning and release of resources with minimal management effort or service provider interaction.

Cloud computing provides services generally without direct active management by the user. Cloud computing systems generally describe data centers available to many users over the Internet. Large clouds, predominant today, often have functions distributed over multiple locations from central servers.

SUMMARY

Embodiments determine a patching sequence for applying software patches to correct a plurality of issues on a cloud system that comprises a plurality of pods. Embodiments receive a list of issues that occurred on each of the plurality of pods during a first time duration and, using a Frequent Pattern Growth ("FP Growth") algorithm, determine issues that frequently occur together and issues that likely follow other issues. Embodiments generate a matrix showing a number of each of the plurality of issues that occurred on each of the pods based on the list of issues during the first time duration, and update the matrix using matrix factorization to provide a relative ranking of each of the issues occurring on each pod. Based on the determined issues that frequently occur together and issues that likely follow other issues and the relative ranking of each issues occurring on each pod, embodiments then generate the patching sequence comprising a time ordered listing of combinations of pods and issues.

DETAILED DESCRIPTION

One embodiment uses predictive analysis to determine when to provide patches or bug fixes to selected cloud system instances or pods in order to optimize the priority of the patches.

Figure 1:
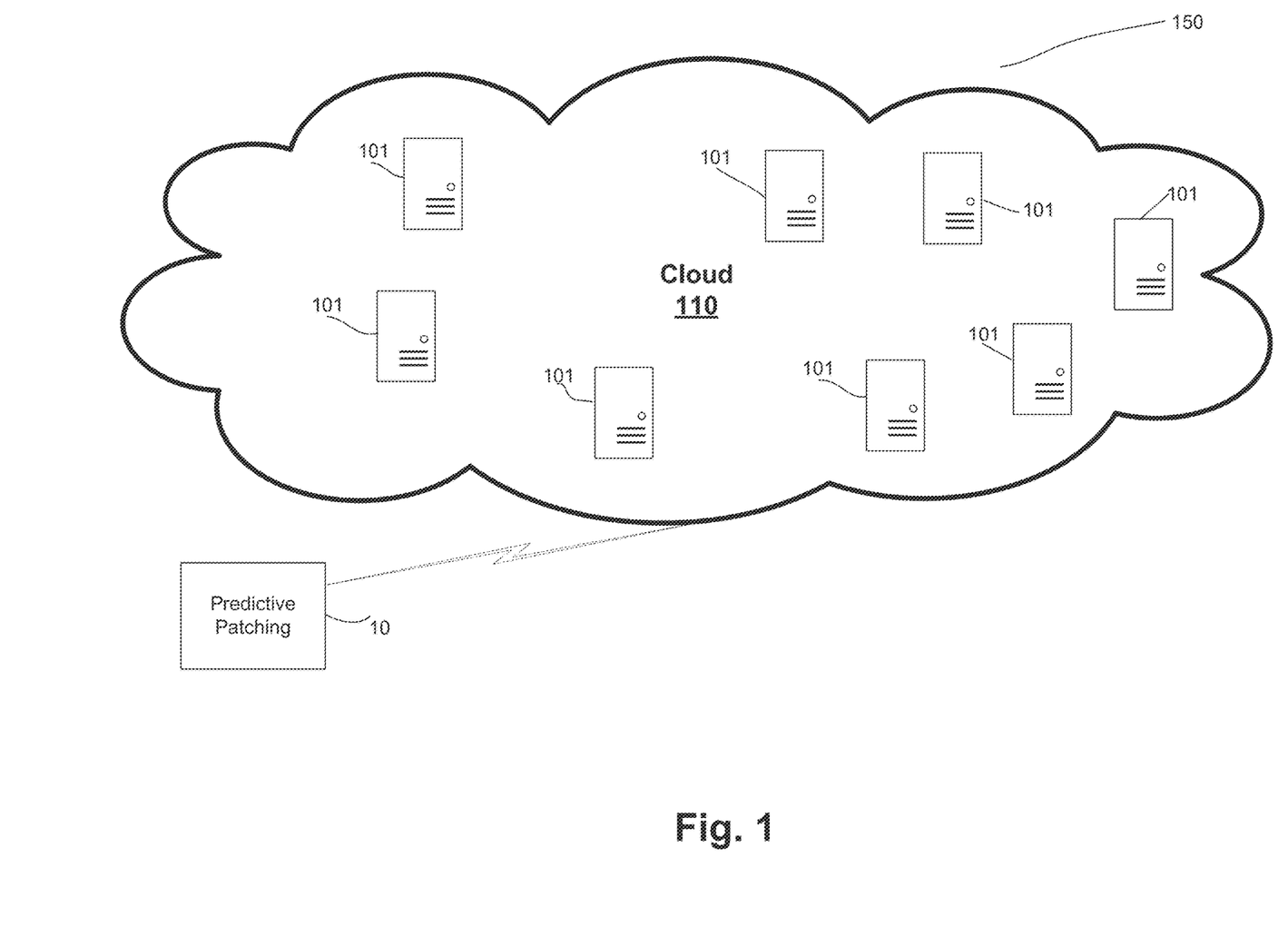
FIG. 1 is an overview diagram of elements of a predictive cloud patching system network/system that can implement embodiments of the invention.

FIG. 1 is an overview diagram of elements of a predictive cloud patching system network/system 150 that can implement embodiments of the invention. As shown in FIG. 1, system 150 includes a multi-tenant "cloud" computer system 110 that is formed of multiple customer instances or systems 101 (each also referred to as a "pod"). Each cloud instance/pod 101 can be considered a self-contained set of functionality—sometimes just an application server and database, sometimes a complete infrastructure with identity management, load balancing, firewalls and so on. Typically, however, the infrastructure services of cloud 110 are shared across multiple applications and database pods.

Pods 101 that serve smaller customers may be one-to-many, multi-tenant instances. Others are dedicated to one-to-one to a single customer. Some are many-to-one, for example a cluster of pods 101 each serving the separate businesses of a large multi-national corporation. In one embodiment, cloud system 110 is the "Cloud Infrastructure" from Oracle Corp.

System 150 further includes a predictive patching system 10 that is externally coupled to cloud 110, and may be internally part of cloud 110. Predictive patching system 10 determines when to provide patches to one or more of cloud instances 101 in an optimized manner, and all other functionality disclosed herein.

Figure 2:
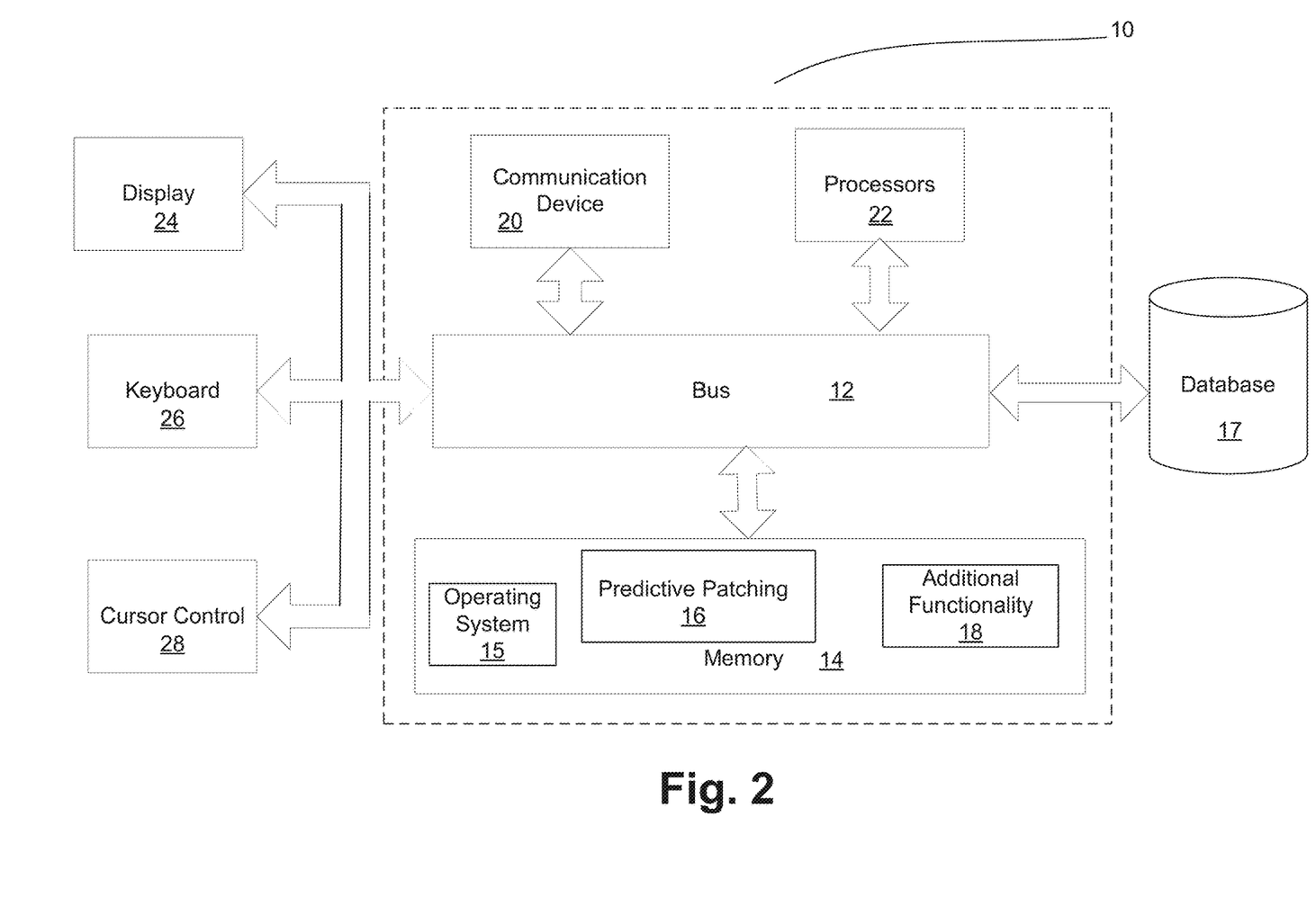
FIG. 2 is a block diagram of predictive patching system of FIG. 1 in the form of a computer server/system in accordance with an embodiment of the present invention.

FIG. 2 is a block diagram of predictive patching system 10 of FIG. 1 in the form of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a predictive patching module 16 that uses predictive analysis to determine when to apply patches, and which instances should be "corrected" by the patches, and all other functionality disclosed herein. System 10 can be part of a larger system. Therefore, system 10 can include one or more additional functional modules 18 to include the additional functionality, such as the "Cloud Service" from Oracle Corp. A file storage device or database 17 is coupled to bus 12 to provide centralized storage for modules 16 and 18, including data regarding any type of issues generated by each of instances/pods 101. In one embodiment, database 17 is a relational database management system ("RDBMS") that can use Structured Query Language ("SQL") to manage the stored data.

In one embodiment, particularly when there are a large number of distributed files at a single device, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as an IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations, and may also implement logistics, manufacturing, and inventory management functionality. The applications and computing system 10 may be configured to operate with or be implemented as a cloud-based networking system, a software-as-a-service ("SaaS") architecture, or other type of computing solution.

Referring again to FIG. 1, system 150, similar to any type of computer software/hardware system, will entail software "bugs" (e.g., an error, flaw or fault in a computer program or system that causes it to produce an incorrect or unexpected result, or to behave in unintended ways) for which software patches need to be applied in order to correct/resolve. In large systems, such as system 150, the application of patches is an ongoing process, typically occurring between major release upgrades which will automatically incorporate all previously applied patches. When a bug is found on one customer system/instance/pod 101 of cloud 150, many cloud providers will apply the patch on all the pods 101 in batches between upgrades. Therefore, if a bug is found in one pod, the bug is fixed using a patch, and the patch is then applied to all of the remaining pods in a batch process However, this may become a problem when there are different bugs found on different pods 101, because applying patches for all the bugs across thousands of pods is a time consuming process. Further, with known systems, the pods are typically divided into different batches (i.e., a subset of pods based, for example, on geography, customers, etc.) for patching, but a particular pod that has a high likelihood of incurring the issue that is the subject of the bug may not be in the first or early selected batch, thus risking operational problems.

In contrast to known solutions, embodiments identify a set of pods that have the most immediate need to have patches applied, and also identify the set of patches that most need to be applied so that the occurrence of known critical issues is minimized. Embodiments use a predictive approach so the patching methodology is optimized. Embodiments use statistical and machine learning techniques in the context of cloud systems to identify the related issues and similar pods that could help in prioritizing the fixing of bugs as well as determining a patching sequence on different pods. Embodiments generate a patching sequence (i.e. a particular pod needs a patch quicker than the other patches based on the likelihood of a bug) and also prioritize the bugs that need to be fixed (i.e., prioritize bugs more likely to happen on a greater number of pods).

Example issues/bugs that may occur in a cloud based environment can include out of memory issues, heap pressure, segmentation violations, process crashes, race conditions and numerous other issues specific to applications and middleware depending on the programming languages and software/hardware platforms involved and based on the customer usage patterns, etc. These issues may be fixed through two mechanisms, patching and upgrading (e.g., new software releases). Patching involves applying patches for specific issues, while an upgrade process takes all of the pods 101 to a particular release/version that includes all of the bug fixes and enhancements. Embodiments are directed to the patching process, as opposed to the upgrading process.

Patching thousands of pods is a cumbersome process for any cloud provider. The challenges faced by a cloud provider are based on the logistical issues involved in applying all the patches on all of the pods at a single cycle. Further, if a patch results in negative side effects, it is a significant resource consuming task to roll all patches back. Therefore, known solutions divide all the pods into batches (i.e., a subsets of all of the pods) and apply the available patches to the batches in a linear manner. However, using this method, the pods where some patches are desperately needed may not be included in the initial set of patches.

In contrast to using batches, embodiments provide a fine grained predictive approach in prioritizing the patches on different pods based on association rules and recommender systems. Embodiments predict/decide the pods where critical issues are likely to happen and all other patches that need to applied on the given pod. Embodiments choose the pods and put the more relevant patches on each pod first, resulting in a more effective and optimized patching sequence and avoiding the problems that would have occurred if the patch were not applied earlier. Embodiments identify the issues that have the broadest impact, and use association rules in order to prioritize the fixes and patching the pods that have more likelihood of issues first. Embodiments improve the customer experience and also save time and effort for the cloud provider as multiple teams are typically involved in triaging the repeated issues on other pods.

Issues need to be prioritized because different customers will run different use cases at different points of time. An issue specific to a use case could occur on a pod because the customer executed the use. For example, issues/bugs that may occur during the execution/use of a cloud-based payroll processing application may include the functionality issues for corner cases/race conditions, server crashes or resource bottlenecks such as CPU, physical memory, heap pressure, etc. In the U.S., payroll may be processed twice a month, so any of these issues may appear for U.S. customers on the 15$^{th}$ of the month. However, in India, payroll may be processed only at the end of the month, so that the same issue may only appear for India customers at the end of the month. When other customers on other pods execute the use case in the future, the same issue could occur there too. Embodiments will predict the pods on which similar issues that could occur in the future, generate a timeline for the patches and apply them proactively.

Frequent Issue Set and Association Rules for the Issues

Figure 3:
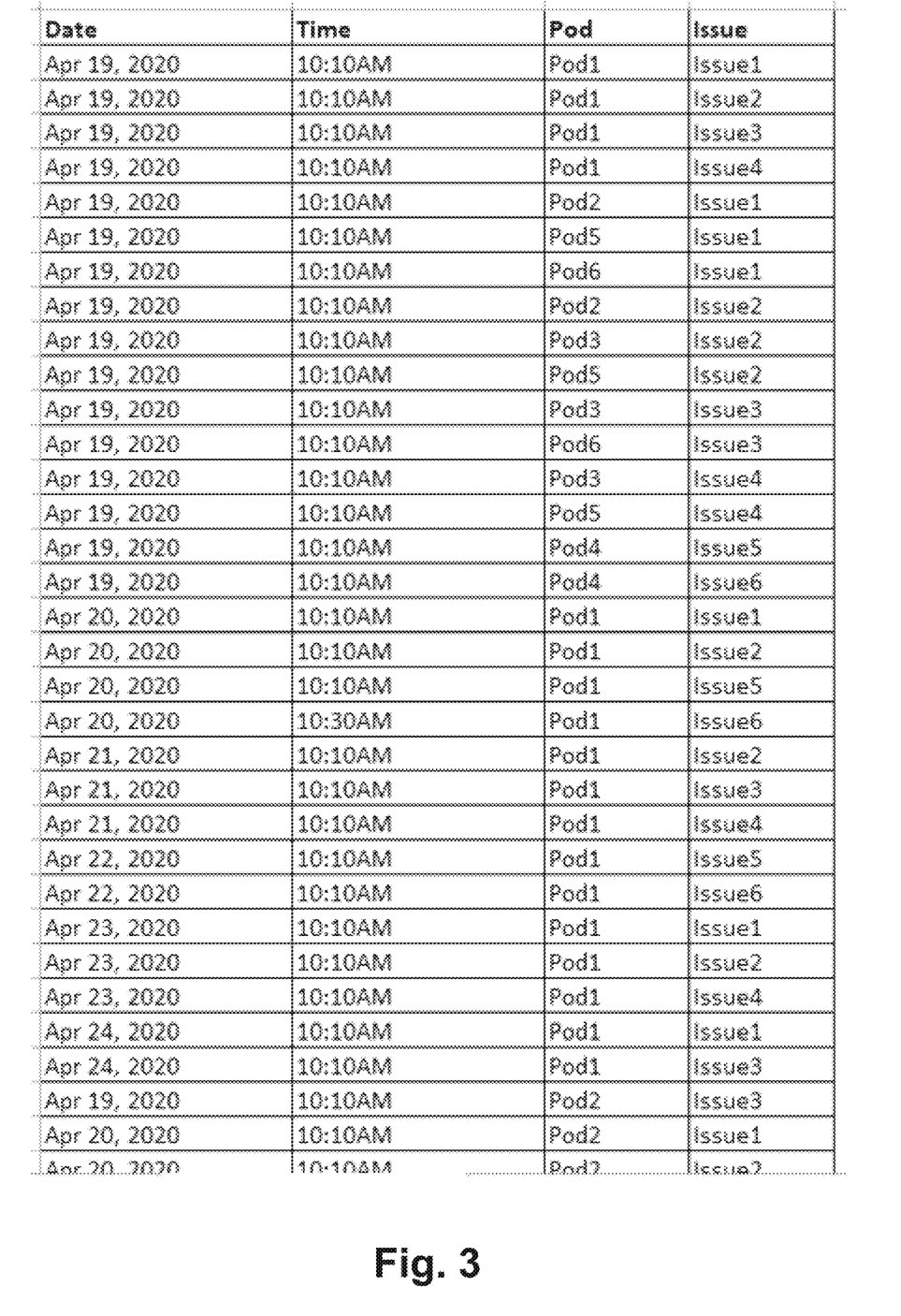
FIG. 3 illustrates a portion of an example issue list generated by the cloud over a period of a few days in accordance with example embodiments.

In operation, as an input, predictive patching system 10 receives a list of issues generated by all of the pods 101 for a fixed time period (e.g., 7 days). FIG. 3 illustrates a portion of an example issue list generated by cloud 110 over a period of a few days in accordance with example embodiments. The list includes the data and time that the issue occurred (i.e., a timestamp), the implicated pod (e.g., "Pod1", "Pod2", etc.) where the issue occurred, and an identity of the issue ("Issue1", "Issue2", etc.). The list shown in FIG. 3 reflects a simplified example. In actuality, there may be thousands of different instances/pods 101, and tens of different issues generated over the course of a few days. The list can cover an hourly, daily, weekly, etc. time period, depending on the number of pods and number of generated issues. The following is a list of issues that occurred for each day during a period of 7 days in this example. For example, on day 1, the following issues occurred: ["Issue1", "Issue2", "Issue3", "Issue4", "Issue5", "Issue6"]:

Issues7days=[
 ["Issue1", "Issue2", "Issue3", "Issue4", "Issue5", "Issue6"],
 ["Issue1", "Issue2", "Issue5", "Issue6"],
 ["Issue2", "Issue3", "Issue4"],
 ["Issue5", "Issue6"],
 ["Issue1", "Issue2", "Issue4"],
 ["Issue1", "Issue3"],
 ["Issue1", "Issue2", "Issue3", "Issue4", "Issue5", "Issue6"]]

Embodiments then convert the listing of issues into matrix form as follows ("Matrix 1"), in which, for each of the 7 days, a "1" indicates that the issue occurred on that day, and a "0" indicates the issue did not occur on that day:

| Matrix 1 | | | | | |
| --- | --- | --- | --- | --- | --- |
| Issue1 | Issue2 | Issue3 | Issue4 | Issue5 | Issue6 |
| 1 | 1 | 1 | 1 | 1 | 1 |
| 1 | 1 | 0 | 0 | 1 | 1 |
| 0 | 1 | 1 | 1 | 0 | 0 |
| 0 | 0 | 0 | 0 | 1 | 1 |
| 1 | 1 | 0 | 1 | 0 | 0 |
| 1 | 0 | 1 | 0 | 0 | 0 |
| 1 | 1 | 1 | 1 | 1 | 1 |

Embodiments then generate a frequent pattern ("FP") tree using a Frequent Pattern Growth ("FP Growth") algorithm. The FP Growth algorithm is a known algorithm for generating association rules and avoids inefficient candidate generation by parsing the dataset multiple times. The FP Growth algorithm builds an efficient FP-tree where the root is NULL and rest of the tree is formed so that each node represents the item in frequent item sets.

In one embodiment, the FP Growth algorithm is as follows: In the first pass, the algorithm counts the occurrences of items (attribute-value pairs) in the dataset of transactions and stores these counts in a "header table". In the second pass, it builds the FP-tree structure by inserting transactions into a trie. Items in each transaction have to be sorted by descending order of their frequency in the dataset before being inserted so that the tree can be processed quickly. Items in each transaction that do not meet the minimum support requirement are discarded. If many transactions share most frequent items, the FP-tree provides high compression close to tree root. Recursive processing of this compressed version of the main dataset grows frequent item sets directly, instead of generating candidate items and testing them against the entire database. Growth begins from the bottom of the header table (i.e., the item with the smallest support) by finding all sorted transactions that end in that item ("I"). A new conditional tree is created which is the original FP-tree projected onto I. The supports of all nodes in the projected tree are re-counted with each node getting the sum of its children counts. Nodes (and hence subtrees) that do not meet the minimum support are pruned. Recursive growth ends when no individual items conditional on meet the minimum support threshold. The resulting paths from root to I will be frequent itemsets. After this step, processing continues with the next least-supported header item of the original FP-tree. Once the recursive process has completed, all frequent item sets will have been found, and association rule creation begins.

Figure 4:
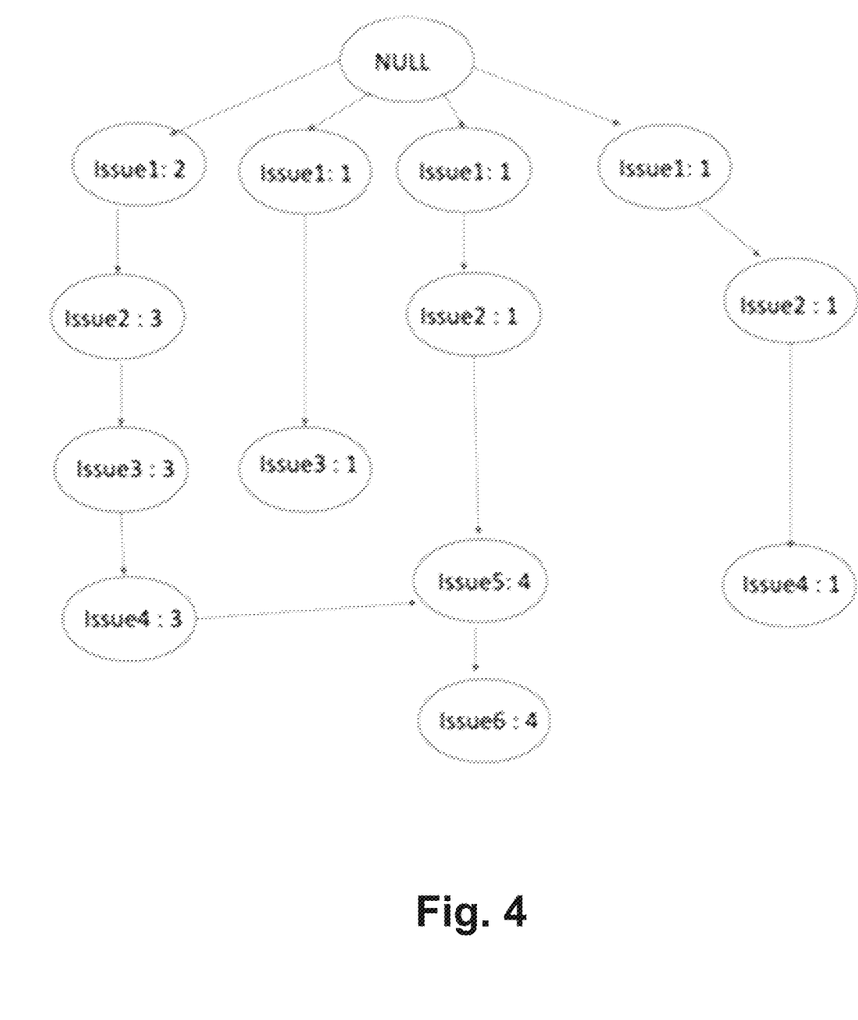
FIG. 4 is a generated FP-tree for the example in accordance with embodiments.

FIG. 4 is a generated FP-tree for the example in accordance with embodiments. The FP-tree allows for easy identification of frequent item sets and association rules. For example, as can be deduced from the FP-tree of FIG. 4, it is clear that whenever Issue2 and Issue3 occurred, Issue4 also occurred. This is a sample association rule. Issue2 and Issue4 occurred four times together. Similarly, Issue5 and Issue6 occurred four times in this example. These occurrences are referred to as "frequent issue" sets. When the issues list gets bigger, it is difficult to build an FP growth tree and derive association rules and frequent issue sets manually. Therefore, embodiments use software routines to derive the association rules and frequent issues sets automatically, rather than building an actual tree. Embodiments use the following example Python pseudocode to identify frequent issue sets and association rules as follows:

import pyfpgrowth
frequent_patterns=pyfpgrowth.find_frequent_patterns(Issues7 days, 3)
association_rules=pyfpgrowth.generate_association_rules (patterns, 0.7)

where 3 indicates the minimum support level (i.e., the number of occurrences that an issue or set needs to occur across all the samples) and 0.7 indicates the minimum probability that an association rule appears.

In the example, the following are the results of the issues occurring frequently together, which indicates that "Issue5" and "Issue6" occurred 4/7 days=57% of the time. Therefore, it is beneficial to have the patches available for these issues and apply them together. Similar results appear for "Issue 2" and "Issue 4". A larger data set provides many more insights.

Sample frequent patterns
('Issue5', 'Issue6'): 4
('Issue2', 'Issue4'): 4
('Issue2', 'Issue6'): 3

Association rules help in identifying the issues that follow others. The following illustrates example association rules for the issues:

Sample association rules
('Issue2', 'Issue3')→(('Issue4'): 100%
('Issue2', 'Issue4')→(('Issue1'): 75%

As shown above, when Issue2 and Issue3 occurred, Issue4 also occurred 100% of the time. Therefore, when a pod is being patched for Issue2 and Issue3, it should also be patched for Issue4. This will help in providing a good alert system that can proactively handle situations before the predicted issue happens.

Identifying Pod Similarity and Predicting Issues

Embodiments receive as input a matrix of issues that occurred on various pods during a given time period (e.g., 7 days). A similarity of each of the pods can be determined based on the patterns of issues. The issues that occurred on the given pod and similar pods in the past provides a prediction that the same issues are likely to occur on similar pods in the near future. In embodiments, the matrix needs to be updated after every patch cycle so that fixed issues will not be included in the modelling. An example issue occurrence matrix for a period of 7 days, for 6 pods, and 6 different issues is as follows ("Matrix 2") where each number is the amount/count of occurrences of that issue for that pod during the 7 day period. A question mark indicates that the issue did not occur on that specific pod during the time period and embodiments then determine the likelihood of the issue occurring on that pod corresponding to the cell. The value of the question mark is assigned as 0 when calculations need to be done during matrix factorization:

| Matrix 2 | | | | | | |
|---|---|---|---|---|---|---|
| Issue Pod | Issue1 | Issue2 | Issue3 | Issue4 | Issue5 | Issue6 |
| Pod1 | 5 | 4 | 3 | 3 | 2 | 2 |
| Pod2 | 4 | 5 | 3 | ? | 2 | 2 |
| Pod3 | 4 | 5 | 5 | 4 | ? | 2 |
| Pod4 | ? | ? | ? | 1 | 1 | 1 |
| Pod5 | 1 | 1 | ? | 1 | 1 | ? |
| Pod6 | 1 | ? | 1 | ? | ? | 1 |

Embodiments attempt to fill in the above pod and issue occurrence matrix (e.g., the question marks) to result in the best possible accuracy. The Matrix 2 is reasonably dense because it is a simplified example (i.e., relatively few question marks), but in reality, with thousands of pods and matrix generally will be very sparse. Sparseness indicates the number of cells without values. In Matrix2, more '?'s indicate more sparseness. If an issue did not occur on a pod yet, the corresponding cell is empty('?'). Here only 6 pods are considered while in reality thousands of pods and tens of issues are considered. However, the matrix will generally be sparse as it is more likely that all issues did not occur yet in different pods as it depends on the use cases, system load, etc., in the selected time period.

Embodiments use matrix factorization algorithms to identify the likely issues on a given pod based on the issues in the other pods. Embodiments identify what issues that did not occur on a pod might occur in the future so that those pods can be proactively patched.

The Matrix 2, referred to as P_I is factorized into $$P\_I = IDP_T \quad \text{(Equation 1)}$$

where I is an Issue matrix, D is a diagonal matrix and $P_T$ is the Transpose of a Pod matrix.

If n is the number of times an issue i has occurred on a pod p, j is the row of I for a pod and q is the column of $P_T$ for a specific issue, Equation 1 becomes:

$$n_{pi} = j_p q_i \quad \text{(Equation 2)}$$

When Equation 2 is solved with least error, embodiments determine the number of times an issue i can happen on a pod p. A matrix factorization algorithm is a class of collaborative filtering algorithms that work by decomposing the matrix into the product of two lower dimensionality rectangular matrices. One embodiment uses a matrix of p rows and i columns (i.e., an initial matrix of p by i dimensions). p represents the number of pods and i represents the number of issues. Embodiments start with random values in matrices (factors) of lesser dimension, for example p×n and n×i matrices. The dot product will give a p×i matrix, result matrix. Embodiments then keep updating the values in factor matrices using gradient and regularization so that their dot product result matrix comes close to the initial matrix for the existing values.

The closest factor matrices are identified and the dot product of which gives a fully filled result matrix, including the question marks replaced with a numerical rating. Each cell in the result matrix gives the relative rating of an issue on a pod. The higher the number in the result matrix, the higher the probability of the issue occurring on the given pod. The patches can be planned first for the issues that might happen more on the pod. The complete matrix could look like the following after using matrix factorization techniques (Matrix 3):

| Matrix 3 | | | | | | |
|---|---|---|---|---|---|---|
| Issue Pod | Issue1 | Issue2 | Issue3 | Issue4 | Issue5 | Issue6 |
| Pod1 | 4.7 | 4.4 | 2.9 | 2.9 | 2.0 | 1.9 |
| Pod2 | 4.3 | 4.4 | 3.3 | 3.1 | 2.1 | 2.0 |
| Pod3 | 4.0 | 5.1 | 4.7 | 4.0 | 2.9 | 2.3 |
| Pod4 | 1.3 | 1.6 | 1.5 | 1.2 | 0.9 | 0.7 |
| Pod5 | 1.0 | 1.2 | 1.1 | 0.9 | 0.7 | 0.5 |
| Pod6 | 0.9 | 1.3 | 1.3 | 1.1 | 0.8 | 0.6 |

One embodiment uses the following steps/calculations to generate Matrix 3 above:

(1) Step1: For the initial matrix of 6×6, start with lower order factors of 6×2 and 2×6 matrices with random numbers—

Initial Factor1 (6×2 matrix)
[[0.78 0.632]
[0.804 0.764]
[0.339 0.744]
[0.932 0.916]
[0.177 0.625]
[0.934 0.374]]

Initial Factor2 (2×6 matrix)
[[0.544 0.411 0.342 0.505 0.382 0.76]
[0.266 0.468 0.761 0.197 0.63 0.757]]

(2) Step2: Get the result matrix with the product of factor matrices—
[[0.592 0.617 0.748 0.518 0.696 1.071]
[0.64 0.688 0.856 0.556 0.788 1.189]
[0.382 0.488 0.682 0.317 0.598 0.821]
[0.75 0.812 1.016 0.651 0.933 1.402]
[0.262 0.365 0.536 0.212 0.461 0.607]
[0.607 0.559 0.604 0.545 0.593 0.993]]

(3) Step3: Find the difference between the result matrix and initial matrix
Get the sum of square of difference between each element in the initial matrix and the result matrix above—
[[4.408 3.383 2.251 2.48 1.302 0.925]
[3.358 4.31 2.141 −0.559 1.209 0.807]
[3.616 4.509 4.315 3.681 −0.602 1.175]
[−0.756 −0.818 −1.02 0.347 0.066 −0.402]
[0.736 0.632 −0.538 0.787 0.538 −0.608]
[0.389 −0.563 0.394 −0.547 −0.594 0.006]]

(4) Step4: Increment the values in Factor1 and Factor2 by gradient and regularization factor
New value in the factor matrix1 (row_x, col_x)=Earlier value+learning factor*(2*difference in cell value*Second factor matrix cell value−coefficient*Earlier value)
New value in the factor matrix2 (row_y, col_y)=Earlier value+learning factor*(2*difference in cell value*First factor matrix cell value−coefficient*Earlier value)

- Value of row_x—0 to number of rows in the initial matrix−1
- Value of col_x—0 to number of columns in the factor1 matrix
- Value of row_y—0 to number of rows in the factor2 matrix−1
- Value of col_y—0 to number of columns in the initial matrix
- Learning factor (typically referred as Alpha) is the amount of jump from the current value. Too small a value will take longer time to get to the right values. Too large a value could miss the ideal factor values. Taken as 0.0002 in this example
- Regularization factor to avoid overfitting. Taken as 0.02 in this example New factors after the calculations will be
Iteration1: Factor1 (6×2 matrix)
[[0.783 0.635]
[0.806 0.766]
[0.342 0.747]
[0.932 0.915]
[0.177 0.625]
[0.934 0.374]]
Iteration1: Factor2
[[0.546 0.413 0.343 0.506 0.382 0.76]
[0.269 0.472 0.763 0.198 0.63 0.758]]
Iteration 1: Result Matrix
[[0.599 0.623 0.753 0.522 0.71.076]
[0.647 0.695 0.862 0.56 0.792 1.194]
[0.388 0.494 0.688 0.321 0.602 0.826]
[0.755 0.817 1.019 0.653 0.934 1.402]
[0.265 0.368 0.538 0.214 0.462 0.608]
[0.611 0.563 0.606 0.547 0.593 0.994]]
Iteration 1: Difference Matrix
[[4.401 3.376 2.245 2.476 1.298 0.92]
[3.351 4.303 2.136 −0.562 1.206 0.803]
[3.61 4.503 4.309 3.677 −0.606 1.169]
[−0.761 −0.823 −1.023 0.345 0.066−0.403]
[0.733 0.629 −0.54 0.785 0.538 −0.609]
[0.385 −0.566 0.391 −0.549 −0.594 0.006]]
Iteration2 Factor1 (6×2 matrix)
[[0.786 0.637]
[0.808 0.769]
[0.345 0.75]
[0.931 0.915]
[0.177 0.625]
[0.934 0.374]]
Iteration2 Factor2
[[0.549 0.416 0.345 0.507 0.383 0.761]
[0.272 0.475 0.765 0.2 0.631 0.758]]
Iteration2 Result Matrix
[[0.605 0.63 0.759 0.526 0.703 1.081]
[0.653 0.701 0.867 0.564 0.795 1.198]
[0.394 0.5 0.693 0.325 0.606 0.831]
[0.76 0.822 1.022 0.655 0.934 1.402]
[0.267 0.371 0.54 0.215 0.462 0.609]
[0.615 0.566 0.609 0.549 0.594 0.994]]
Difference
[[4.395 3.37 2.24 2.472 1.295 0.915]
[3.345 4.297 2.13 −0.566 1.203 0.799]
[3.604 4.497 4.304 3.673 −0.609 1.164]
[−0.766 −0.828 −1.025 0.342 0.065−0.403]
[0.73 0.627 −0.541 0.784 0.537 −0.61]
[0.382 −0.57 0.389 −0.55 −0.595 0.006]]

Some of the squares of the above difference needs to be minimized. The sum of squares of all values in the above matrix is ~149. It can be referred as Cost. The square value is taken as the difference can be positive or negative.

By repeating the process of modifying the values in the factor matrices, the cost/error will come down Finally, the factors could be:
[[2. 1.]
[1.7 1.3]
[1. 2.4]
[0.6 0.6]
[0.2 0.7]
[0.5 0.4]]
And
[[1.9 1.5 0.5 0.9 0.5 0.8]
[0.9 1.5 1.8 1.3 1. 0.5]]

Embodiments will eventually arrive at the product matrix. There can be slight variation in the values as the starting factor matrices but the final values will be similar.

The following Python pseudocode code segments can be used for the above matrix factorization in some embodiments to generate the equivalent of Matrix 3:

```
#numpy package for matrix operations
import numpy as np
#Start with 2 factor matrices with random values
Factor1=np.random.rand(numRows, lowerOrder)
Factor2=np.random.rand(numCols, lowerOrder)
Ex: Factor1=np.random.rand(6, 2)
Factor2=np.random.rand(2, 6)
#Find the dot product of factors
resultMatrix=np.dot(Factor1, Factor2)
#Find the error/cost/difference
For all rows and columns
CostMatrix=InitialMatrix[row][col]−np.dot(Factor1[row,:],Factor2[:,col])
#Update values in the factor matrices with gradient and regularization
for rowNum in range(len(InitialMatrix)):
    for colNum in range(len(InitialMatrix[rowNum])):
        for lowOrder in range(2):
            Factor1[rowNum][lowOrder]=Factor1[rowNum][lowOrder]+learning_rate*(2*eij*Factor2[lowOrder][colNum]−
                regulairization_factor*Factor1[rowNum][lowOrder])
            Factor2[lowOrder][colNum]=Factor2[lowOrder][colNum]+learning_rate*(2*eij*Factor1[i][k]−
                regulairization_factor*Factor2[lowOrder][colNum])
```

```
#Overall cost or difference or error ie. Sum of squares of
difference in different elements
    for rowNum in range(len(InitialMatrix)):
        for colNum in range(len(InitialMatrix[rowNum])):
            e=e+pow(InitialMatrix[rowNum][colNum]−np.dot
                (Factor1[rowNum,:],Factor2[,colNum]), 2)
    #The above is repeated for number of steps with updated
values in factors
    listOfStepsCost.append({"step":step, "Cost":e})
    #Plot cost graph. Final factors are taken with minimum
cost
    pd.DataFrame(listOfStepsError).plot.line(x='step',
y='Cost')
```

Embodiment use Matrix 3 (or the generated ratings values of Matrix 3) to detect issues that are likely to happen on a given pod and the pods on which an issue is more likely to happen. For example, for Matrix 3, the following illustrates the priority of patches for Pod3 along with relative ratings:

| Issue | Rating |
|---|---|
| Iesue2 | 5.1 |
| Issue3 | 4.7 |
| Issue4 | 4.0 |
| Issua1 | 4.0 |
| Issue5 | 2.9 |

The key issues that are likely to happen on more pods needs to be fixed and patched at higher priority. The following illustrates the importance of a patch relative to Issue1 on different pods:

| Pod | Rating |
|---|---|
| Pod1 | 4.7 |
| Pod2 | 4.3 |
| Pad3 | 4.0 |
| Pod4 | 1.3 |
| Pod5 | 1.0 |

Embodiments then use the above information to choose the pods to patch in the immediate/initial waves. The pods where most critical issue(s) is/are likely to occur, can be selected in the immediate wave. Once the batch of pods is selected, the patches corresponding to the most likely issues to occur, using the above association determinations, are included in the patch bundle. For example, for the above examples, a sequence of patching can be as follows:
  From the Matrix 3, the top 3 scores are 5.1, 4.7 (two occurrences) and 4.4.
  Based on this, Issue2 (5.1) and Issue3 (4.7) needs to be patched on Pod3. From the association rules—('Issue2', 'Issue3')→(('Issue4'): 100%. Whenever Issue2 and Issue3 occurred, Issue 4 also occurred. So, it is better to include the patch for Issue4 also in the first batch. From the association rules, ('Issue2', 'Issue4') →(('Issue1'): 75%. So, include patch for Issue1 also for Pod3. Next in line in Matrix3 is Issue1 (4.7) that is more likely to occur in Pod1. Eventually, the following patching sequence, which can be considered a time ordered listing of combinations of pods and issues, can be followed:
  Pod3: Patch for Issue2, Issue3, Issue4, Issue1
  Pod1: Patch for Issue1
Similarly, the scoring in Matrix3 and association rules can be used in deciding the priority of fixing issues and patching the pods.

Figure 5:
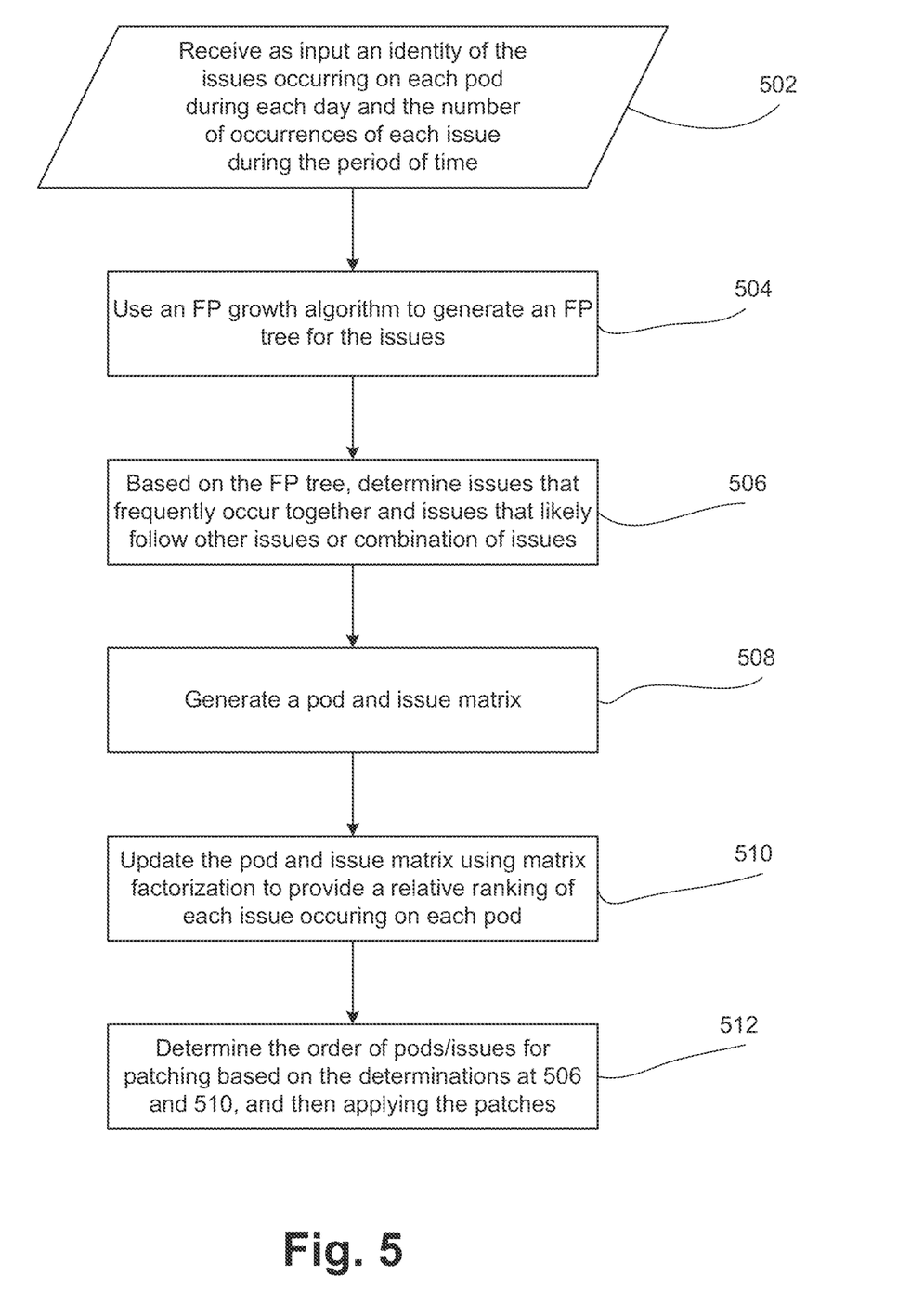
FIG. 5 is a flow diagram of the functionality of the predictive patching module of FIG. 2 for using predictive analysis to determine when to apply patches, and which instances should have patches applied.

FIG. 5 is a flow diagram of the functionality of predictive patching module 16 of FIG. 2 for using predictive analysis to determine when to apply patches, and which instances should have patches applied.

At 502, input data is received from pods 101 during a fixed period of time (e.g., 1 week, or 7 days) that includes an identity of the issues occurring on each pod during each day (or other time period such as each hour), as shown for example in Matrix 1, as well as the number of occurrences of each issue during the period of time, as shown for example in Matrix 2.

At 504, a FP growth algorithm is used to optionally generate an FP tree for the issues.

AT 506, based on the FP tree, or calculated directly without generating an FP tree, issues that frequently occur together (i.e., frequent issues sets) are determined, and issues that likely follow other issues or combination of issues (i.e., issue association rules) are determined.

At 508, a pod and issue matrix is generated (e.g., Matrix 2) that shows the number of each of the issues that occurred on each of the pods during the period of time.

At 510, matrix factorization is used to update the pod and issue matrix that provides a relative ranking of each issue occurring on each pod (e.g. Matrix 3).

At 512, the determination of 506 and 510 are used to determine a priority/order of applying which patches to which pods, and then the patches are applied. In embodiments, the starting point will be pod and issue combination with the high score in Matrix3. For example, assume PodX and IssueY are selected. Then other issues will be picked up based on the association rules and frequent issue sets where IssueY is part of. Then, for PodX, the list of other issues that are more likely to occur are retrieved from Matrix3. The associated issues are then determined for those issues. From both these combinations, PodX will have a plurality of issues that need to be patched. Similarly, and subsequently, other pods where the selected issues have high scores and other associated issues will be selected for patching.

As disclosed, for cloud system instances/pods, different issues happen at different times and patching is done to correct the issues. However, when the system includes thousands of pods, it is important to prioritize the batches of pods and batches of patches to be applied. Embodiments use data concerning different issues that occurred on different pods during a specific duration and provide a recommendation on the pods to be patched first and the additional patches to be applied on each pod. For example, if Issue3 occurs on some pods, embodiments determine the pods where Issue3 is more likely to happen as well and suggests those additional pods for patching. The model used by embodiments is updated every time a patching cycle occurs on the pods so that it is aware and does not predict an issue to occur if it is already patched.

Embodiments identify all the pods where a particular issue is likely to occur, and also for the given pod, what are the likely issues to happen with a relative rating. This helps in prioritizing the fixing of bugs and in identifying the pods that can be patched in the initial and other early batches. For the selected pod, embodiments determine what are the other patches that need to be applied. In contrast, known solutions generally take all the patches available, divide all the pods into batches, and apply them. Applying all the patches on all the pods all at once creates logistical issues. Further, if the patch creates an unwelcome side effect, the patch needs to be rolled back from all the pods. In contrast, embodiments provide a fine grained approach that helps in patching the pods first where the issue is more likely to happen even though it has not already occurred.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A method of determining a patching sequence for applying software patches to correct a plurality of issues on a cloud system that comprises a plurality of pods, the method comprising:
   receiving a list of issues that occurred on each of the plurality of pods during a first time duration;
   using a Frequent Pattern Growth (FP Growth) algorithm, determining issues that frequently occur together and issues that likely follow other issues;
   generating a matrix showing a number of each of the plurality of issues that occurred on each of the pods based on the list of issues during the first time duration;
   updating the matrix using matrix factorization to provide a relative ranking of each of the issues occurring on each pod;
   based on the determined issues that frequently occur together and issues that likely follow other issues and the relative ranking of each issues occurring on each pod, generating the patching sequence comprising a time ordered listing of combinations of pods and issues.

2. The method of claim 1, the patching sequence comprising a first pod and a first list of issues to patch on the first pod, and a second pod and a second list of issues to patch on the second pod.

3. The method of claim 1, wherein the relative ranking of each issues comprises a numerical score for each pod and issue combination.

4. The method of claim 3, the generating the patching sequence comprising:
   selecting a first pod and first issue combination having a highest score and a second pod and second issue combination having a second highest score;
   determining first additional issues that likely occur when the first issue and the second issue occur from the FP Growth algorithm;
   determining second additional issues that likely follow either the first issue or the second issue from the FP Growth algorithm; and
   generating the sequence comprising the first pod and the first issue and the first and second additional issues that correspond to the first pod, and the second pod and the second issue and the first and second additional issues that correspond to the second pod.

5. The method of claim 1, the updating the matrix that comprises p rows and i columns, where p represents a number of pods and i represents a number of issues, comprises:
   initializing with random values in factor matrices of lesser dimension comprising p×n and n×i matrices; and
   updating the values in the factor matrices using gradient and regularization so that a dot product result matrix comes close to an initial matrix for existing values until a closest factor matrix is identified.

6. The method of claim 1, wherein the cloud system is a multi-tenant cloud system and each pod comprises a self-contained functionality for one or more of a plurality of tenants.

7. The method of claim 1, wherein the plurality of issues comprise one or more of memory issues, heap pressure, segmentation violations, process crashes or race conditions that occur on a particular pod.

8. A non-transitory computer-readable medium having instructions stored thereon that, when executed by one or more processors, cause the processors to determine a patching sequence for applying software patches to correct a plurality of issues on a cloud system that comprises a plurality of pods, the determining the patching sequence comprising:
   receiving a list of issues that occurred on each of the plurality of pods during a first time duration;
   using a Frequent Pattern Growth (FP Growth) algorithm, determining issues that frequently occur together and issues that likely follow other issues;
   generating a matrix showing a number of each of the plurality of issues that occurred on each of the pods based on the list of issues during the first time duration;
   updating the matrix using matrix factorization to provide a relative ranking of each of the issues occurring on each pod;
   based on the determined issues that frequently occur together and issues that likely follow other issues and the relative ranking of each issues occurring on each pod, generating the patching sequence comprising a time ordered listing of combinations of pods and issues.

9. The computer-readable medium of claim 8, the patching sequence comprising a first pod and a first list of issues to patch on the first pod, and a second pod and a second list of issues to patch on the second pod.

10. The computer-readable medium of claim 8, wherein the relative ranking of each issues comprises a numerical score for each pod and issue combination.

11. The computer-readable medium of claim 10, the generating the patching sequence comprising:
   selecting a first pod and first issue combination having a highest score and a second pod and second issue combination having a second highest score;
   determining first additional issues that likely occur when the first issue and the second issue occur from the FP Growth algorithm;
   determining second additional issues that likely follow either the first issue or the second issue from the FP Growth algorithm; and
   generating the sequence comprising the first pod and the first issue and the first and second additional issues that correspond to the first pod, and the second pod and the second issue and the first and second additional issues that correspond to the second pod.

12. The computer-readable medium of claim 8, the updating the matrix that comprises p rows and i columns, where p represents a number of pods and i represents a number of issues, comprises:
   initializing with random values in factor matrices of lesser dimension comprising p×n and n×i matrices; and
   updating the values in the factor matrices using gradient and regularization so that a dot product result matrix comes close to an initial matrix for existing values until a closest factor matrix is identified.

13. The computer-readable medium of claim 8, wherein the cloud system is a multi-tenant cloud system and each pod comprises a self-contained functionality for one or more of a plurality of tenants.

14. The computer-readable medium of claim 8, wherein the plurality of issues comprise one or more of memory issues, heap pressure, segmentation violations, process crashes or race conditions that occur on a particular pod.

15. A predictive patching system for multi-tenant cloud system comprising a plurality of pods, the predictive patching system comprising:

one or more processors programmed to determine a patching sequence for applying software patches to correct a plurality of issues on the cloud system, the determining the patching sequence comprising:

receiving a list of issues that occurred on each of the plurality of pods during a first time duration;

using a Frequent Pattern Growth (FP Growth) algorithm, determining issues that frequently occur together and issues that likely follow other issues;

generating a matrix showing a number of each of the plurality of issues that occurred on each of the pods based on the list of issues during the first time duration;

updating the matrix using matrix factorization to provide a relative ranking of each of the issues occurring on each pod;

based on the determined issues that frequently occur together and issues that likely follow other issues and the relative ranking of each issues occurring on each pod, generating the patching sequence comprising a time ordered listing of combinations of pods and issues.

16. The predictive patching system of claim 15, the patching sequence comprising a first pod and a first list of issues to patch on the first pod, and a second pod and a second list of issues to patch on the second pod.

17. The predictive patching system of claim 15, wherein the relative ranking of each issues comprises a numerical score for each pod and issue combination.

18. The predictive patching system of claim 17, the generating the patching sequence comprising:

selecting a first pod and first issue combination having a highest score and a second pod and second issue combination having a second highest score;

determining first additional issues that likely occur when the first issue and the second issue occur from the FP Growth algorithm;

determining second additional issues that likely follow either the first issue or the second issue from the FP Growth algorithm; and generating the sequence comprising the first pod and the first issue and the first and second additional issues that correspond to the first pod, and the second pod and the second issue and the first and second additional issues that correspond to the second pod.

19. The predictive patching system of claim 15, the updating the matrix that comprises p rows and i columns, where p represents a number of pods and i represents a number of issues, comprises:

initializing with random values in factor matrices of lesser dimension comprising p×n and n×i matrices; and updating the values in the factor matrices using gradient and regularization so that a dot product result matrix comes close to an initial matrix for existing values until a closest factor matrix is identified.

20. The predictive patching system of claim 15, wherein each pod comprises a self-contained functionality for one or more of a plurality of tenants.

* * * * *

UNITED STATES PATENT AND TRADEMARK OFFICE
CERTIFICATE OF CORRECTION

| | | |
|---|---|---|
| PATENT NO. | : 11,204,758 B1 | Page 1 of 2 |
| APPLICATION NO. | : 16/990043 | |
| DATED | : December 21, 2021 | |
| INVENTOR(S) | : Vattikuti | |

It is certified that error appears in the above-identified patent and that said Letters Patent is hereby corrected as shown below:

In the Drawings

On sheet 5 of 5, in Figure 5, under Reference Numeral 510, Line 3, delete "occuring" and insert -- occurring --, therefor.

In the Specification

In Column 3, Line 67, delete "process" and insert -- process. --, therefor.

In Column 7, Line 5, delete "(('Issue4'):" and insert -- ('Issue4'): --, therefor.

In Column 7, Line 6, delete "(('Issue1'):" and insert -- ('Issue1'): --, therefor.

In Column 9, Line 48, delete "0.71.076]" and insert -- 0.7 1.076] --, therefor.

In Column 10, Line 60, delete "leaming" and insert -- learning --, therefor.

In Column 10, Line 62, delete "regulairization" and insert -- regularization --, therefor.

In Column 10, Line 65, delete "leaming" and insert -- learning --, therefor.

In Column 10, Line 66, delete "regulairization" and insert -- regularization --, therefor.

In Column 11, Line 6, delete "[,colNum]), 2)" and insert -- [:,colNum]), 2) --, therefor.

In Column 11, Line 12, delete "(Iist" and insert -- (list --, therefor.

In Column 11, Line 22, delete "Iesue2" and insert -- Issue2 --, therefor.

In Column 11, Line 25, delete "Issua1" and insert -- Issue1 --, therefor.

Signed and Sealed this
Twenty-ninth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,204,758 B1

In Column 11, Line 37, delete "Pad3" and insert -- Pod3 --, therefor.

In Column 11, Line 53, delete "(('Issue4'):" and insert -- ('Issue4'): --, therefor.

In Column 11, Line 57, delete "(('Issue1'):" and insert -- ('Issue1'): --, therefor.